No. 11,792. Reissued Nov. 28, 1899.

H. C. H. COOPER, Dec'd.

UNITED STATES VOTING MACHINE COMPANY, Assignee.

VOTING MACHINE.

(Application filed Oct. 9, 1899.)

7 Sheets—Sheet 1.

Witnesses
L. C. Hills
John H. Hall

Inventor:
H. C. H. Cooper.
By Geo. B. Selden
Attorney

No. 11,792. Reissued Nov. 28, 1899.

H. C. H. COOPER, Dec'd.

UNITED STATES VOTING MACHINE COMPANY, Assignee.

VOTING MACHINE.

(Application filed Oct. 9, 1899.)

7 Sheets—Sheet 2.

Witnesses
L. C. Hills
John H. Holt

Inventor
H. C. H. Cooper
by
Geo. B. Selden
Attorney

No. 11,792. Reissued Nov. 28, 1899.
H. C. H. COOPER, Dec'd.
UNITED STATES VOTING MACHINE COMPANY, Assignee.
VOTING MACHINE.
(Application filed Oct. 9, 1899.)
7 Sheets—Sheet 3.
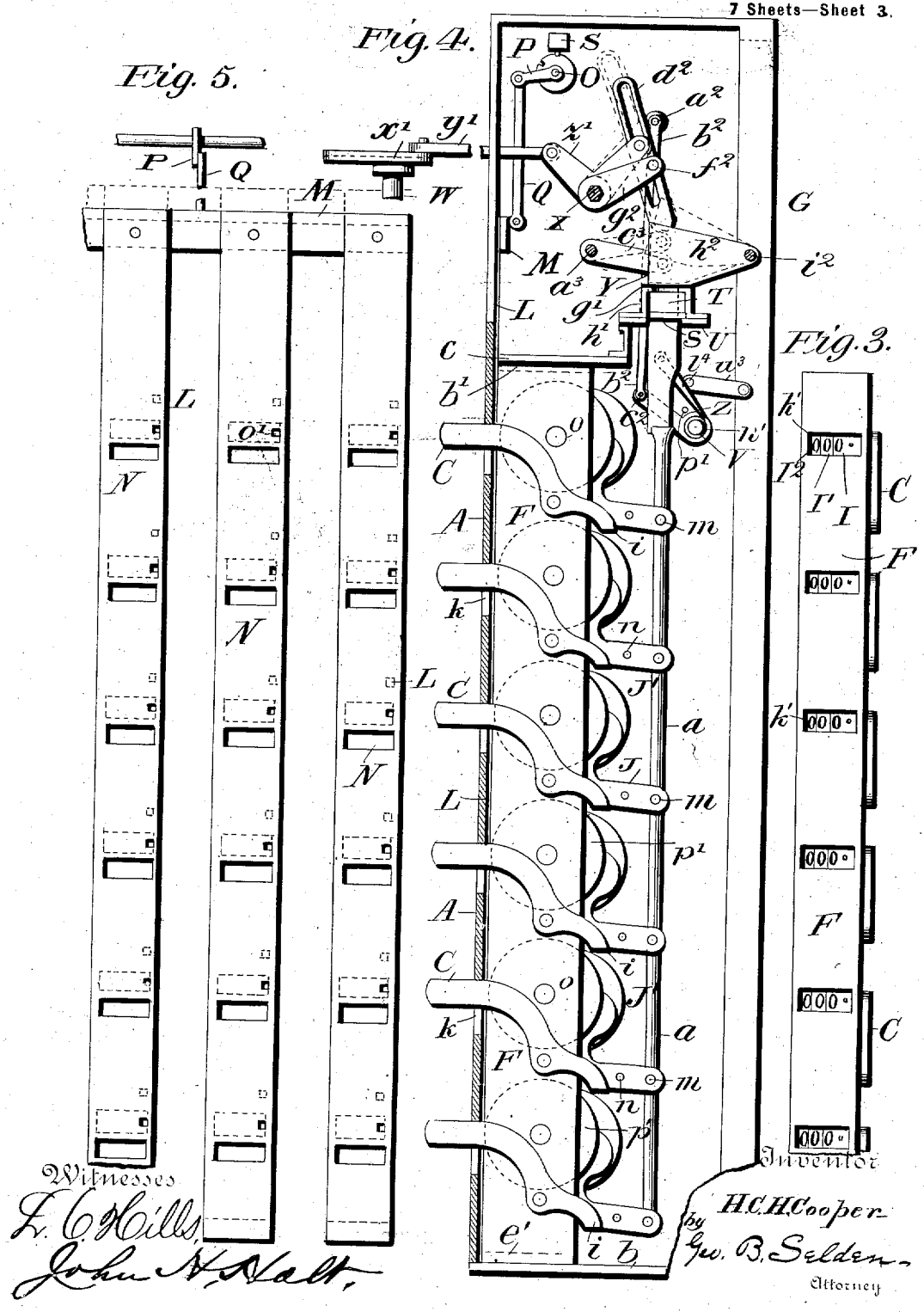

No. 11,792. Reissued Nov. 28, 1899.
H. C. H. COOPER, Dec'd.
UNITED STATES VOTING MACHINE COMPANY, Assignee.
VOTING MACHINE.
(Application filed Oct. 9, 1899.) 7 Sheets—Sheet 4.
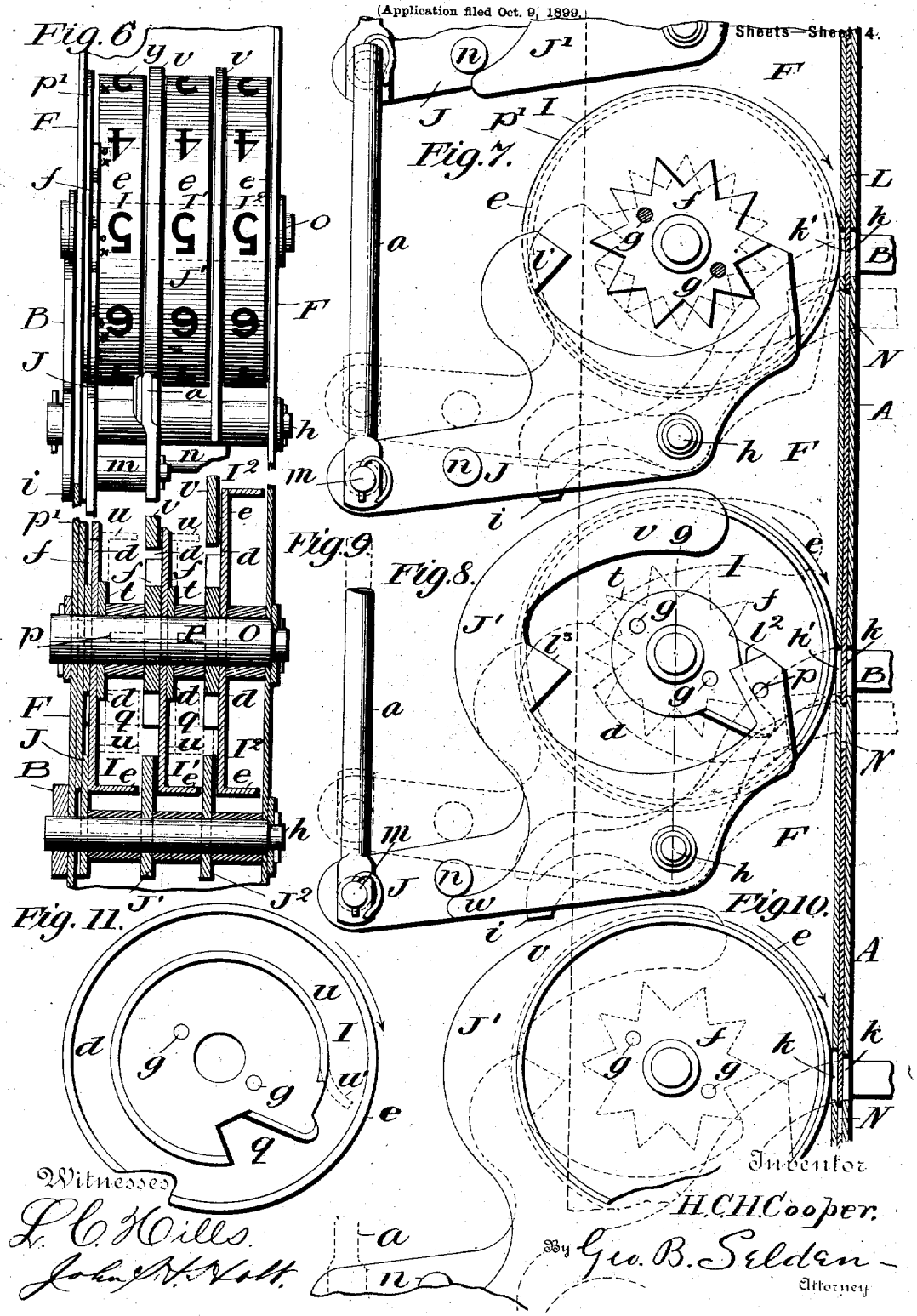
Witnesses
L. C. Hills.
John W. Holt.
Inventor
H. C. H. Cooper.
By Geo. B. Selden
Attorney No. 11,792. Reissued Nov. 28, 1899.

H. C. H. COOPER, Dec'd.

UNITED STATES VOTING MACHINE COMPANY, Assignee.

VOTING MACHINE.

(Application filed Oct. 9, 1899.)

7 Sheets—Sheet 5.

Witnesses

L. C. Hills

John H. Hall

Inventor

H. C. H. Cooper

By Geo. B. Selden

Attorney

No. 11,792. Reissued Nov. 28, 1899.

H. C. H. COOPER, Dec'd.

UNITED STATES VOTING MACHINE COMPANY, Assignee.

VOTING MACHINE.

(Application filed Oct. 9, 1899.)

7 Sheets—Sheet 6.

Witnesses

L. C. Hills.

John N. Hall.

Inventor

H. C. H. Cooper.

By Geo. B. Selden.

Attorneys.

No. 11,792. Reissued Nov. 28, 1899.
H. C. H. COOPER, Dec'd.
UNITED STATES VOTING MACHINE COMPANY, Assignee.
VOTING MACHINE.
(Application filed Oct. 9, 1899.)
7 Sheets—Sheet 7.
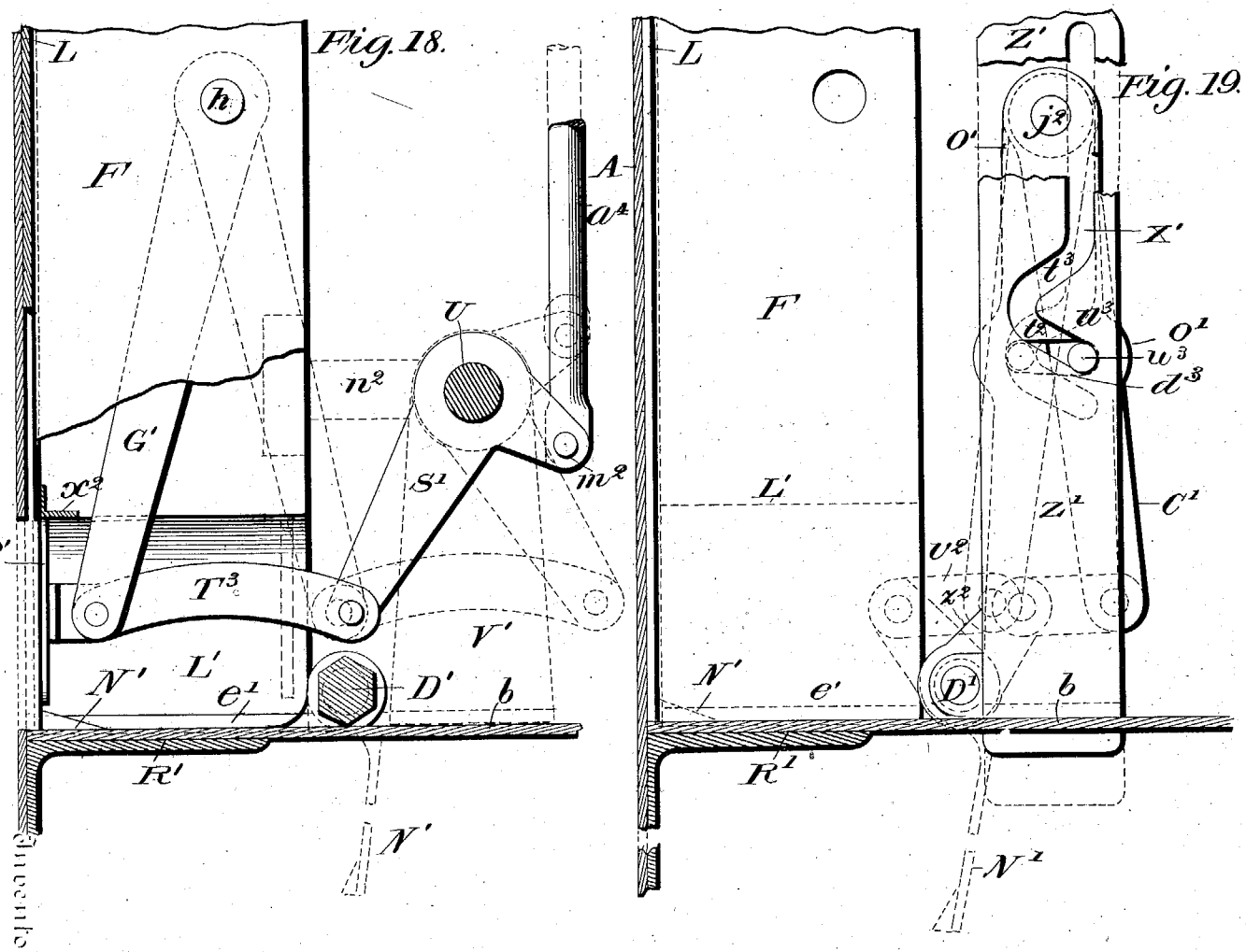
Witnesses
L. C. Hills
John N. Hall.
Inventor
H. C. H. Cooper.
By Geo. B. Selden
Attorney

UNITED STATES PATENT OFFICE.

UNITED STATES VOTING MACHINE COMPANY, OF JAMESTOWN, NEW YORK, ASSIGNEE OF HENRY C. H. COOPER, DECEASED.

VOTING-MACHINE.

SPECIFICATION forming part of Reissued Letters Patent No. 11,792, dated November 28, 1899.

Original No. 614,419, dated November 15, 1898. Application for reissue filed October 9, 1899. Serial No. 733,123.

DIVISION B.

*To all whom it may concern:*

Be it known that HENRY C. H. COOPER, late a citizen of the United States and a resident of Jamestown, in the county of Chautauqua, in the State of New York, did invent certain Improvements in Voting-Machines, of which the following is a specification, reference being had to the accompanying drawings.

The invention relates to improvements in voting-machines designed more particularly for use on that type of positive-acting voting-machines which were first shown in Patent No. 526,668, issued September 25, 1894, to S. E. Davis, but capable of use in other relations.

Figure 1:
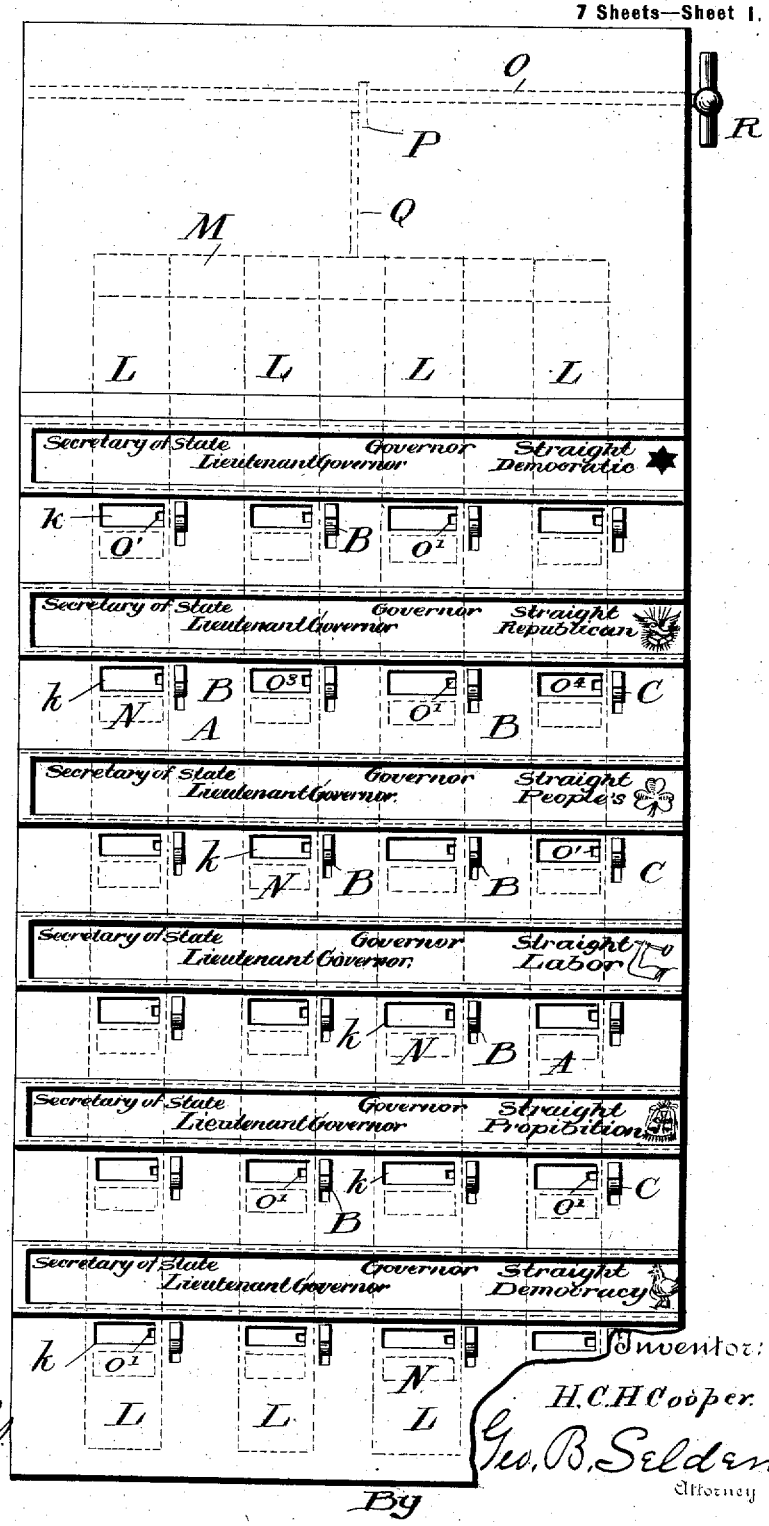
Figure 2:
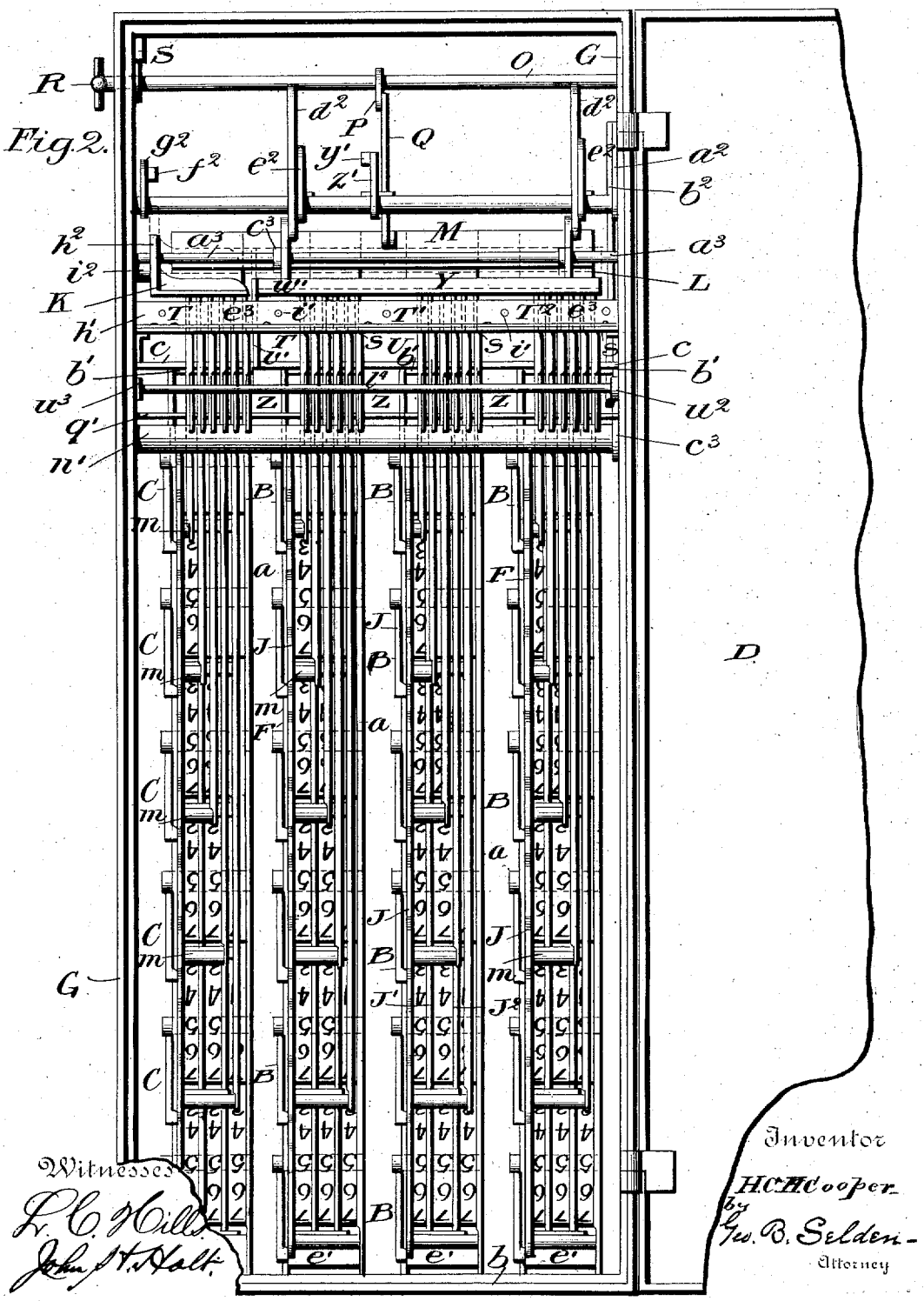
Figure 12:
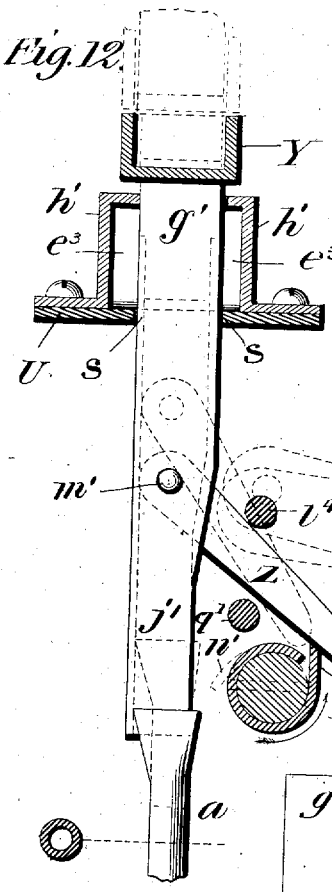
Figure 13:
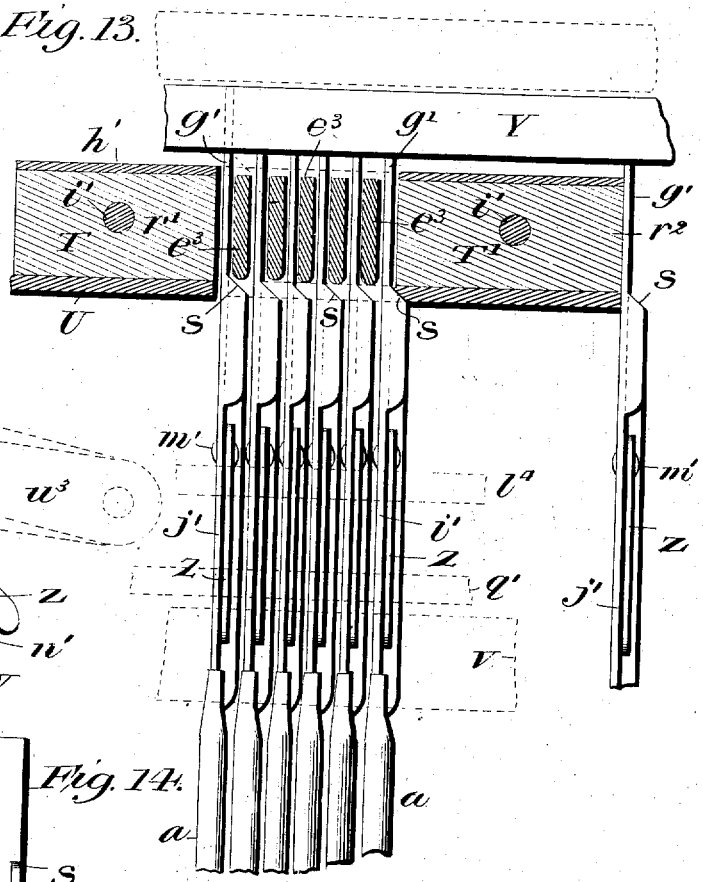
Figure 14:
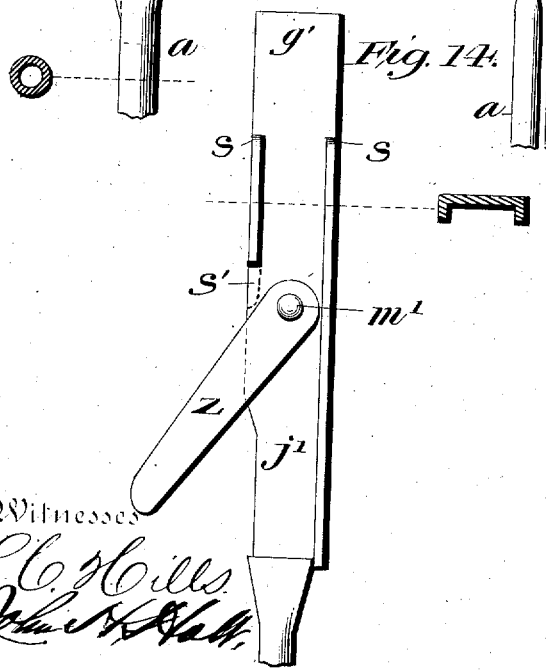
Figure 15:
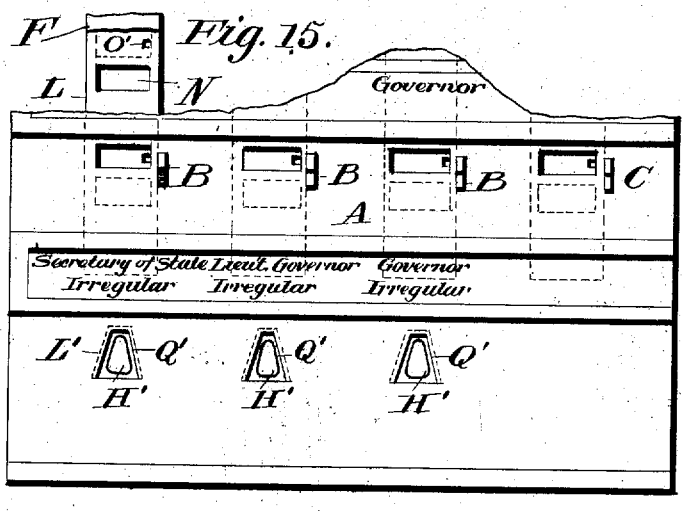
Figure 17:
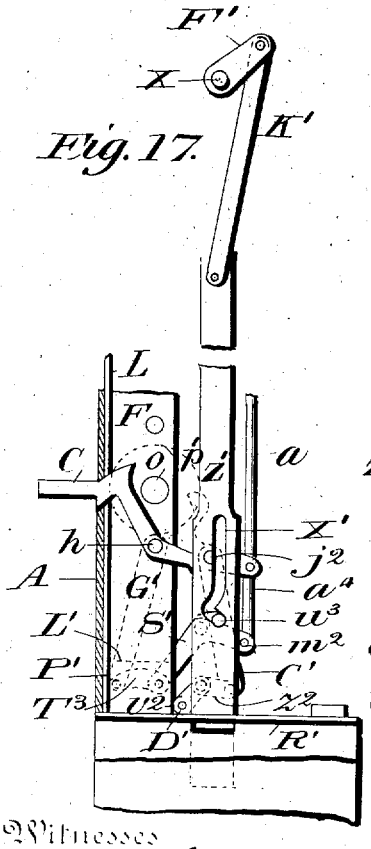
Figure 20:
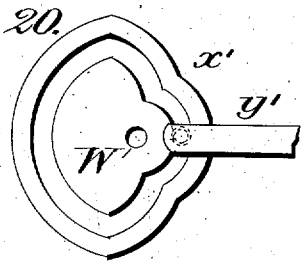
Figure 16:
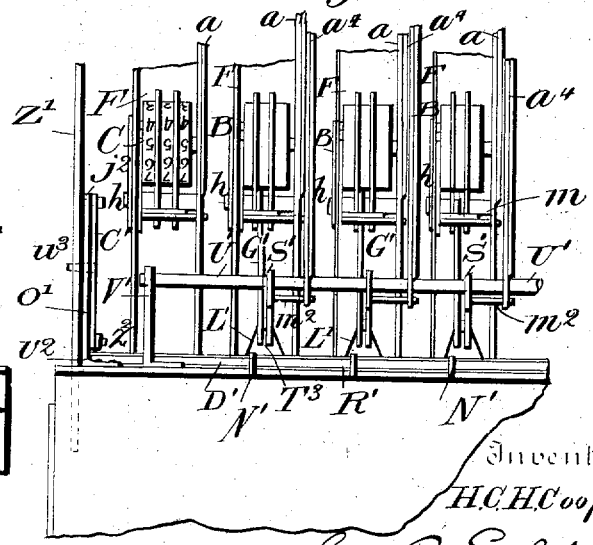

In the accompanying drawings, representing the improvements, Figure 1 is a front elevation of the key-plate of a voting-machine embodying the improvements arranged for six parties and for candidates for three different offices. Fig. 2 is a rear elevation of the same, the door being open. Fig. 3 is a front elevation of one of the counter-sections detached. Fig. 4 is a side view of the improved voting-machine as seen from the left in Fig. 2, the casing next the observer being removed. Fig. 5 is a front view of the shutter by which the counters are covered until the close of an election. Fig. 6 is a rear elevation of one of the counters. Fig. 7 is a side view of the palleted lever, the toothed wheel, and circular plate of one of the counters. Fig. 8 is a side view of one of the palleted yokes and the disk which operates it. Fig. 9 is a central vertical section on the line 9 9, Fig. 8. Fig. 10 is a side view of one of the counters as seen from the right hand in Fig. 6. Fig. 11 represents a modified form of the units or tens disk detached. Fig. 12 is a side view of the upper part of one of the interlocking rods, showing the channel for the interlocking blocks in section. Fig. 13 is a longitudinal section of the interlocking mechanism. Fig. 14 represents the upper end of one of the interlocking rods as seen from the side opposite to that shown in Fig. 12. Fig. 15 represents the lower part of the key-plate with the improved irregular-voting mechanism. Fig. 16 is a rear elevation of the improved irregular-voting mechanism. Fig. 17 is a side view of the same, partially in section, showing the connection with the interlocking rod. Fig. 18 is a side view of the irregular, showing the connection with the interlocking mechanism. Fig. 19 is a side view of the same, showing the mechanism for delivering the ballot-holder into the ballot-receptacle. Fig. 20 represents the cam on the door or turnstile.

In the accompanying drawings, A is the key-plate, which is arranged in the vertical position, so as to form one side of the voting-compartment, as is usual with this class of machines.

B are the keys for selective voting, and C the keys for straight-ticket voting. Each key is provided with a counter and interlocking mechanism is employed between the different counters and also between the selective mechanism and the straight-ticket counters. In the arrangement shown the keys corresponding to the different candidates for the same office are placed in vertical lines, the keys for all the candidates for any particular political party occupying the horizontal rows. The voting-booth is provided with any suitable entrance and exit doors, and suitable connections are arranged, so that a voter on leaving the booth resets the apparatus into the normal position ready for the next voter. The booth is not shown in the accompanying drawings, but it will be understood that such part of the machine is arranged in any suitable or preferred way.

The construction of the improvements herein described differs from that shown in the said Davis patent in two important features, the straight-ticket votes being registered on separate counters and the group-voting mechanism and the single-candidate-voting mechanism being interchangeable.

The voting apparatus is provided at the back with a door D, Fig. 2; but this is only used to inspect the machinery and to set the counters and it may be locked and sealed during the whole of an election, including the counting of the votes cast. The key-plate is provided with apertures opposite the counters, which apertures are closed by a suitable shutter or shutters while the election is in progress, but which are opened when the voting is over, so as to permit the proper election officials to inspect the counters from the front of the plate and to count the votes cast for the different candidates and to announce the result. By taking off the vote from the front of the key-plate one set of ballots or ballot-captions is dispensed with, since two such sets must be used when the vote is examined from the rear, one in front and one on the back, and thereby either reduce the amount of printing or dispense with it entirely and prevent errors which might arise through accident or design from misplaced cards or other causes. In this construction the figures on the counter are displayed at the close of the election in immediate proximity to the placard indicating the office and the name of the candidate.

This improved voting-machine differs in other respects from those described in the said patent of Davis and in the Davis patents of November 12 and November 19, 1895, as will be pointed out later. Provision may be made for irregular balloting in any suitable way—such, for instance, as that shown in the said Davis patents or as described hereinafter.

The key-plate is provided with a series of movable parts or keys, which may be either pushes or pulls, or, as shown in the accompanying drawings, levers B C, Fig. 1, which are moved downward by the voter to operate or indicate the corresponding counters. The voting apparatus is inclosed within a suitable supporting frame or box G, which sustains the parts and protects them from injury or interference. The key-plate forms the front of the box or inclosure and the door D the back or rear side. The keys project through slots in the plate, being provided, if desired, (see C, Fig. 17,) with curved wings inside the plate to keep the slots closed in all positions of the keys. In the construction shown in Fig. 17 one of these wings works inside the key-plate and the other, which is on the lower edge of the key, travels down outside the plate, the edges of these wings being curved on a circle from the center *h*. The counters in each vertical line are supported in a removable channel or section F, to which the keys B are also pivoted. The channel F is shaped like a trough, with its open side behind, the front side, which corresponds to the bottom of the trough, being provided with apertures *k'*, through which the counters are read off, and the two sides being perforated to support the pins or studs which carry the counters and their operating parts. The channeled sections facilitate the construction and assembling of the machine, since all the counters and their connected parts for any one vertical line may be put together on the bench and the channel then placed in the machine as a whole ready for use, it only being necessary to connect the interlocking rods *a* to the levers J. The removal or replacement of the counter channels or sections is made from the front of the machine, the key-plate A when put on serving to hold the sections in place. The base *b* of the machine is provided with a series of lugs or projections *e'* of a size corresponding with the width of the channels between the sides, which lugs serve to secure the channels in place when the latter are inserted on them. A corresponding series of lugs *b'* over the transverse plate *c* serve to secure the upper ends of the channels, which are slipped over the lugs from the front of the apparatus, the key-plate A when attached holding the channels in place over the lugs. In this way provision is made for easily inserting or removing the channels with their counters and keys.

The method of actuating the counters from the keys will be understood from Figs. 6 to 11, inclusive. Each of the counters consists of three numbered disks I I' I², of which I is the units-disk, I' the tens-disk, and I² the hundreds-disk. The disks consist of a circular plate *d*, having a flange *e* turned or drawn on it, the flange being marked with the figures "0" to "9" in any suitable way. The counter-disks are supported so as to revolve freely on a stud *o*, secured in the side walls of the channels F in any suitable way. Each of the counter-disks is provided with a toothed or star wheel *f*, which is secured to the disk by the rivets *g*.

J is the palleted lever, which actuates the units-disk, and J' J² the palleted yokes, which actuate the tens and hundreds disks, respectively. The lever and yokes are pivoted, so as to turn freely on the stud *h*, secured in the side walls of the channel in any suitable way. The key B is also pivoted on the stud *h*, which on one side extends beyond the side walls of the channel. The key B is provided with a projecting lip *i* at its lower end, which reaches under the lever J and causes the latter to swing on its pivot when the outer end of the key B is depressed. The movement is indicated by the full and dotted lines in Fig. 7. The lever J is made of such a shape, as shown, that when it swings fully the inclined pallets *l l'*, Fig. 7, with which it is provided, engage with the teeth of the star-wheel *f*. When the voter depresses the outer end of the key B, the lever J is raised and the pallet *l'* swings inward and engages with one of the teeth of the wheel *f*. The units-disk I partakes of this movement, being secured to the star-wheel *f* by the rivets *g*. When the voter leaves the booth, the lever J is returned to the normal position, and this motion engages the pallet *l* between two of the teeth of the wheel *f* and imparts to it the twentieth of a revolution necessary to bring the next figure into proper position relative to the aperture *k'*, Figs. 3 and 7, in the front of the channel F, through which the indications of the counter are visible. It will be observed that one or the other of the pallets *l l'* are all the time in the path of revolution of the teeth of the star-wheel *f* and that thus any accidental movement of the numbered disk is prevented. It will also be understood that since the counting movement of the disk is not completed until the voter leaves the booth it is impossible to repeat a vote or otherwise tamper with the counter. At its rear end the lever J is provided with a stud $m$, to which the interlocking rods $a$ are pivoted. These studs $m$ are made of different lengths, the shortest being on the lever of the upper counter in the construction shown, as indicated in the rear view, Fig. 2, so that the interlocking rods $a$ are straight and parallel with each other, each lower stud $m$ being enough longer than the one next above it to allow its interlocking rod to pass by the rod attached to such higher stud. The lever J also carries a stud $n$, which produces the return movement of the yokes $J'$ $J^2$, when the apparatus is reset to normal position. These studs $n$ are all of the same length, extending over both of the yokes.

When the units-disk has made a complete revolution, it is necessary to shift the tens-disk $I'$ a tenth of a revolution. This is accomplished by a swinging movement of the palleted yoke $J'$, which is moved in one direction by the units-disk I and in the opposite direction by the stud $n$ on the lever J. The pallets $l^2$ $l^3$ of the yoke $J'$ act on the teeth of the star-wheel $f$, which is attached to the tens-disk $I'$. The pallet $l^2$ of the yoke $J'$ is provided with a pin $p$, which projects into the open space inside the flange $e$ of the units-disk I and at the proper time encounters the inclined flange $q$, by which the pin $p$ is forced outward, this movement disengaging the pallet $l^2$ from the star-wheel and engaging the pallet $l^3$ with it on the opposite side, thereby imparting one-twentieth of a revolution to the wheel $f'$ and the tens-disk $I'$. The flange $q$ is so placed on the units-disk relatively to the figures on the flange that it encounters the pin $p$ at the time the units-counter as viewed through the aperture $k$ is changing from "9" to "0," at which time the tens-disk should change from "0" to "1." The flange $q$ is attached to the units-disk in any suitable way, such as by the rivets $g$, which fasten the star-wheel to the disk. In Fig. 11 a plate is indicated by the dotted lines $t$, which may be secured to the units-disk by the rivets $g$, the flange $q$ being bent up from such plate. A circular flange $u$, Fig. 11, may also be employed, of a diameter sufficient to pass just outside the pin $p$, which operates to prevent any accidental movement of the yoke $J'$ when the lever J is raised. In this case the flange $u$ should be cut away just in front of and behind the flange $q$ to permit the movement of the pin, and the two flanges may be formed in one piece and secured to the disk by the rivets $g$, as before described. The flange $u$ may be bent outward, as indicated by the dotted lines $u'$, Fig. 11, so as to insure the engagement of the pin $p$ inside of it. The yoke $J'$ is pivoted so as to swing freely on the stud $h$, and it is extended upward between the disks, as indicated at $v$, to prevent the disks from coming in contact with each other. The return movement of the yoke $J'$, which completes the counting movement of the tens-disk, is secured by the downward motion of the lever J, acting through the stud $n$ on the upper edge of the arm $w$ on the yoke.

The method of imparting one-tenth of a revolution to the hundreds-disk $I^2$ when the tens-disk $I'$ has made a complete revolution is similar to that already described for operating the tens-disk from the units-disk. The tens-disk $I'$ is provided with a flange-line $q$, and the yoke $J^2$ is provided with a pin corresponding to pin $p$. The operation of the parts is exactly similar to that already described. The yokes $J'$ and $J^2$ are interchangeable with each other, and so, also, are the disks $I'$ and $I^2$, except that the latter, in case only three counters are used, counting up to "999," need not be provided with the flange $q$.

The resetting of the counters at zero is easily accomplished. The door D being open, the election official sees that the units-disk shows the figure "8" through the opening $k$, raises the lever J, and then by working the arms $w$ of the yokes $J'$ $J^2$ rotates the disks $I'$ $I^2$ until the figures "9" on them show through the aperture $k$. This occurs when the figures "4" on the disks are visible from the back on a level with the stud $o$. Either of the disks may be so set before the other. The up-and-down movement of the lever J also sets the units-disk at "9," and then a single movement of the key B and resetting-bar Y changes all the disks from "999" to "000," in which position the machine is in condition to begin an election. When the circular flange $u$ is employed, the resetting can only be done when the units and tens disks are in such position that the pin P can pass through the openings between the flange $q$ and the ends of the flange $u$, preferably through the space $x$ between $q$ and the front end of the flange $u$. The disks will then show between "4" and "5" on the horizontal line from the back.

It is desirable to give a voter a visible indication of the operation of the voting apparatus, so that he may know that he has voted. This is accomplished by allowing a portion of the units-disk or the edge of a plate revolving therewith to be seen through an opening $o'$ in the key-plate and by so marking or coloring the surface so visible that a change of the marking or coloring may be observed by the voter every time the units-disk moves. For instance, an opening being made through the key-plate opposite the row of characters $y$, Fig. 6, on the units-disk I the change from one character to another will be visible to the voter. The character may be alternately "o" and "x" or a cross in a visible manner, or any other suitable character may be employed, or the spaces may be of different colors—say red and white—and then the visible portion of the disk would change from red to white, or vice versa, at each voting operation.

A circular plate $p'$, Figs. 6 and 7, may be attached to the units-disk on the outer side of the star-wheel, and the edge of this disk, suitably marked or colored, may be displayed through an opening in the key-plate. This plate $p'$ also serves as a guide for the lever J.

In any arrangement provision should be made for preventing the voter from seeing any of the figures on the counter-disks, either by bringing the units-disk or the edge of the plate $p'$ close against the key-plate or by extending flanges backward from the edges of the aperture in the key-plate.

The arrangement of the shutter by which the figures on the counters are covered during the progress of an election will be understood from Figs. 1, 4, and 5. In the construction shown the shutter consists of a number of strips of sheet metal L, one for each channeled section and all being attached to the cross-bar M, so that they may be shifted simultaneously. Each of the strips is provided with a series of apertures N, Figs. 1 and 5, which correspond with the apertures $k$ through the key-plate A. The strips L are arranged in front of the sections and normally while an election is being held with the openings N out of register with the openings $k$. In this position the counters are protected from view by the shutter; but at the close of the polls the shutter is shifted by any suitable means, so that the openings N come opposite the holes $k$, when the indications on the counters are exposed. It will be observed that the openings $k'$ in the front wall of the channeled sections come opposite the openings $k$ in the key-plate. The strips L slide between the front of the section and the key-plate, being guided in any suitable way, if necessary. The shaft O, crank P, and connection Q form a convenient way of shifting the shutter, so as to cover or uncover the figures on the counters. This shaft extends across the machine, being supported in suitable bearings and provided with the crank P, which is connected with the cross-bar M by the link Q. The shaft O is provided at one side on the machine with the handle R, and it may be arranged so as to be locked in either or both positions of the shutter, or other devices may be employed to hold the shutter in the open or closed position. A lock S, Fig. 4, the bolt of which engages with a pin or pins or in a notched plate attached to the shaft O, answers this purpose effectively, the keys being held by the election officials until the close of the polls.

In case the movement of the counter be made visible an additional opening $o'$, Figs. 1 and 5, is made through the shutter in such position as to display the row of characters $y$, Fig. 6, on the units-disk or the row of characters or party-colored spaces on the edge of the circular plate $p'$, while the figures on the counters are covered. These openings $o'$ register with the openings $k$ in the key-plate, so that the characters or colors are visible through them. It will, however, be understood that the device for rendering the movement of the counter visible may be employed on voting-machines which are read from the back and are not provided with shutters, in which case the apertures $o'$ would be made in the key-plate and in front of the channeled section. It will also be understood that the shutter may be made in one piece and that various different devices for shifting and locking it may be adopted.

The construction and operation of the interlocking mechanism will be understood from Figs. 2, 4, 12, 13, and 14. Each of the levers J is pivoted to an interlocking rod $a$, and these interlocking rods are provided near their upper ends with the thickened or wedge-like portions $s$, which when one of the rods is raised by the operation of its key force the interlocking blocks $e^3$, Fig. 13, apart, so that they fill the whole space between the abutments T T', and thus prevent the raising of any other rod and the actuation of any other key in the same vertical line. The blocks $e^3$ are slightly movable laterally in their supports and the rods $a$ are permitted also the requisite amount of lateral movement. The upper parts $g'$ of the interlocking rods and the blocks are made of such thicknesses that when one of the wedges $s$ is thrust in between them the rods at each side of the series bear against the abutments T T' and none of the other wedges can be inserted, so that the voter finds it impossible to vote for more than one of the candidates for any particular office. The lower ends of the interlocking blocks are preferably rounded or beveled. The bar U extends across the machine, being sustained in any suitable manner, and supports the blocks and the abutments. The blocks are made somewhat wider than the upper portions of the interlocking rods, as indicated in Fig. 12, so that they rest at their lower corners on the bar U, which is perforated to allow the rods to pass through it. The channel $h'$ serves to hold the blocks in place on the bar U, being provided with flanges which are fastened to the bar. The abutments are prevented from moving lengthwise in the channel by bolts, screws, or pins $i'$, which pass through the vertical sides of the channel. These pins or screws are made removable for the purpose of adapting the machine to multicandidate-voting, as hereinafter described. The interlocking rods $a$ may be hollow, being formed by drawing a metallic strip of suitable width through a die and having their lower ends flattened and perforated for attachment to the studs $m$ of the levers J. At their upper ends the tubular rods are brazed or otherwise secured to the strip $j'$, which has its edges turned over to form the wedge or wedges $s$ and to which the trips L are pivoted at $m'$, Figs. 12 and 14. At their upper ends the strips $j'$ form thin portions $g'$, which are located between the interlocking blocks $e^3$ and by which the interlocking rods are held in line and in proper engagement with the interlocking blocks. In the particular construction shown the strips $j'$ are secured to the tubular rods by having their lower ends inserted and brazed in the longitudinal joint of the hollow rods.

When one of the interlocking rods is raised by the actuation of its corresponding key and counter, the catch or dog Z engages with the trip-shaft V and holds the rod elevated until the apparatus is restored to normal position by the voter while passing out of the booth. (See full and dotted lines, Figs. 2 and 13.) The key will not remain depressed or the rod elevated until the dog has engaged with the trip-shaft, so that the voter knows that he has not properly operated the counter until the key stays down, the weight of the interlocking rods and attached parts serving to return the key from any position to which it may have been moved until the dog is actually engaged with the trip-shaft. The shaft V is provided with a projecting lip $n'$, with which the point of the dog Z engages, as indicated by the dotted lines in Fig. 12. A stationary rod $q'$, extending across the machine between the dogs and the interlocking rods, prevents the dogs from moving too far, and another movable rod or bar $l^4$ rests on the upper or rear side of the dogs. This rod $l^4$ is hung on arms $w^2$ $w^3$, pivoted to the frame of the machine, and serves to prevent any unnecessary movement of the dog and also positively forces the dog Z into engagement with the lip $n'$. An excessive outward movement of the dog Z may be prevented by carrying the flange $s$ down, as indicated at $s'$, Fig. 14, so that it will arrest the movement of the dog at its farthest point. The dog is tripped and the rod released by the partial rotation of the trip-shaft V in the direction indicated by the arrow in Fig. 12 by the movement of the door or turnstile as the voter passes out of the voting-compartment. Any suitable means of securing this result may be adopted, but in the arrangement shown the shaft or pintle W, Fig. 4, of the door or turnstile is provided with a cam or crank $x'$, which, through the connection $y'$ and crank $z'$, imparts a partial rotation to the rock-shaft X, which by crank $a^2$, connection $b^2$, and crank $c^2$ transmits the requisite movement to the trip-shaft V. The rock-shaft X extends across the machine, being supported in any suitable journals.

The cranks $a^2$ $c^2$ and connection $b^2$ may be located at one end of the machine and either inside or outside the casing. It is needless to remark that any connections or moving parts outside of the case should be protected, so that they cannot be interfered with. As the trip-shaft V turns the lip $n'$ raises the dog and rod slightly and passing underneath the point of the dog allows it to escape from its engagement, so that the rod and dog may assume their normal position, as indicated in Fig. 12. Provision is made for restoring the parts to their normal position by the movable bar Y, which extends along over the interlocking rods and may rest thereon. When one of the interlocking rods is raised, the bar Y is elevated, (see full and dotted lines, Figs. 2 and 13,) and it remains in that position until forced downward positively by the movement of the door or turnstile as the voter leaves the voting-compartment. This movement is secured from the rock-shaft X; but as it is necessary that the dog or dogs Z should be unlocked before the rod or rods are depressed the construction is such that the trip-shaft V is moved first. This is secured by the slots in the links $d^2$, Figs. 2 and 4, which permit the cranks $e^2$ to move a certain distance (during which time the dogs are unlatched by the trip-shaft V) before the bar Y is depressed by the pins in the cranks $e^2$ arriving at the lower ends of the slots. The bar Y is then pressed downward and acting on the ends $g'$ of the interlocking rods forces them back to their normal positions, completes the movement of the counters, and restores all parts of the machine to the position necessary for the next voting operation.

Straight-ticket-voting—that is, the case when a voter desires to vote for all the candidates of any one party—is provided for by arranging a row of keys, levers, and counters preferably at one side of the selective-voting mechanism, so that the voter can indicate his political preference by a single movement, thereby reducing the time occupied in voting and increasing the capacity of the machine. Suitable interlocking mechanism is employed between the straight-ticket and the selective voting mechanism, so that a voter having actuated the straight-ticket counter of any political party cannot thereafter vote for any other party. In this case in order to ascertain the total vote it will be necessary at the close of the election to add the number shown on the straight-ticket counter to the number indicated by the counter devoted to any particular candidate of the same party, the sum of these numbers giving whole vote cast for such candidate. Thus suppose it be required to find the vote for the Republican candidate for lieutenant-governor. The number on the counter at $o^3$, Fig. 1, is added to the number on the counter at $o^4$, and the sum of these numbers represents the whole vote for this candidate. In a similar manner the vote for any other candidate is determined.

The keys for actuating the straight-ticket counters are represented at C in the accompanying drawings, the counters being of the same construction as those already described, mounted in a removable section F and provided with interlocking rods, locking-dogs, and interlocking blocks in a manner similar to that previously set forth. The interlocking with the selective-voting counters is provided for by attaching a wedge or interlocking rod $v'$, Fig. 2, to the bar Y and arranging such wedge in relation with the interlocking blocks $e^3$ and their abutments of the straight-ticket counters, so that when the bar Y is raised by one of the interlocking rods of any of the selective-voting counters none of the straight-ticket counters can be raised. The movement of any of the interlocking rods which will engage the dog with the trip-shaft and insert the thickened portion of the rod between the interlocking blocks will also insert the wedge $v'$ between or alongside of the interlocking blocks $e^3$. On the contrary, when one of the straight-ticket counters has been operated the wedge $v'$ cannot be inserted between the abutments, the bar Y cannot be raised, and consequently none of the selective-voting counters can be actuated. It will be seen that by this arrangement provision is made for positively interlocking the straight-ticket counters and the selective-voting mechanism, so that they cannot be voted simultaneously. The wedge $v'$ is provided with a thin shank, which extends up through the bar U and is pivoted to the bar Y at $w'$, Fig. 2. The bar Y is arranged to move up and down in suitable guides, or it may be swung by arms $e^9$, pivoted on a transverse shaft $a^8$, Figs. 2 and 4. In order to restore the straight-ticket counters to normal position, the pivoted plate K is used, which is lifted up by any one of the interlocking rods and is forced downward by the pin $f^2$ on the arm $g^2$ on the rock-shaft X. (See Fig. 4.) The plate K extends over all the interlocking rods of the straight-ticket counters and is provided with a flange $h^2$, which is pivoted to the frame at $i^2$ and extends upward into the path of the pin $f^2$. It will be observed that when the rock-shaft X moves the trip-shaft V will be operated before the pin $f^2$ encounters the flange $h^2$. The trip-shaft and its longitudinal flange or ledge $n'$ are conveniently formed by bending a strip of suitable metal around a shaft, leaving the ledge to project, and by securing the parts together by pins or screws.

In order to provide for the irregular vote—that is, for the votes which may be cast for persons not put in nomination by any of the political parties—the irregular voter is furnished with a box or ballot-holder of any suitable or preferred form, and the voter having placed his ballot, either written or printed, in the holder inserts the latter in an opening on the key-plate which operates the interlocking mechanism, so that the voter cannot vote for any other candidate for the same office, and when the voter leaves the booth the ballot-holder is delivered into the ballot-receptacle. The ballot-holder may be round or flat and open at one end or separable in any suitable way. In Fig. 15 of the accompanying drawings has been represented the orifice Q' for the insertion of the ballot-holder as having the form of a truncated cone and the holder H' of a corresponding form. Behind the key-plate is placed a suitable inverted trough or guide L', which is provided at the bottom with the movable door or support for the holder. The inclination of the sides of the guide outward prevents the stuffing of it with paper or waste, since anything which will not fall out of it when the door N' swings downward will be ejected by the return movement of the plunger P'. The door swings downward and opens the bottom of the guide and returns to place before the plunger is moved. The guide is conveniently formed of sheet metal, being provided with suitable flanges, by which it is attached either to the key-plate or to the bed R', Figs. 17 and 18, or the ballot-holder guide may be attached to the channeled sections already described, which sustain the counters of each vertical line. When the ballot-holder is inserted in the guide, the plunger P' is forced backward, as represented by the full and dotted lines in Fig. 18, and this movement is transferred to the interlocking rod $a^4$ by the bell-crank lever S'. The irregular interlocking rod $a^4$ is provided at its upper end with the wedge and trip the same as the interlocking rods already described and is operated in the same way to prevent voting for any regular candidate in the same vertical line, the only difference being that in a machine arranged for handling the votes of six political parties if the irregular-voting mechanism is employed there will be seven interlocking rods and their corresponding interlocking blocks and other parts. When the rod $a^4$ of the irregular-voting device is thrust upward, its wedge fills the allotted space between the interlocking block and none of the other interlocking rods of the same series can be operated, and consequently none of the counters in the same vertical line can be operated. It will also be observed that if one of the straight-ticket counters is operated the irregulars are then locked out, and vice versa. Consequently the simultaneous use of any of the irregulars is prevented. Each of the irregular plungers P' is provided with a lever S' and an interlocking rod $a^4$. The levers S' are pivoted on a rod U', extending across the machine and supported at its ends and intermediately, if required, by the brackets V', attached to the bed R'. At one end the levers S' are pivoted to the corresponding interlocking rods and at the other end to the arms $T^3$, attached to the plunger P'. Each plunger and its arm may be made in one piece or connected together in any suitable way. The levers S' are each provided with a stud $m^2$, Fig. 17, which brings the interlocking rods $a^4$ outside of the rods $a$ of the selective-voting counters. The plunger may be arranged to slide in any suitable guides, and for this purpose its stem may be a straight rod; but it is preferred to swing it on the link G, Figs. 17 and 18, which may be conveniently pivoted on the stud $h$ of the lowest counter, which is next above the irregular mechanism. The plunger and its stem being thus supported by the link G' and the long arm of the lever S' will travel in a course sufficiently straight for its purpose. When the restoring-bar Y, Fig.

2, descends, the interlocking rods $a^4$ are forced downward and the plungers P′, if any have been used, are returned to the normal position, (indicated by the full lines in Fig. 18;) but before this occurs, as already described, the trip-bar is rocked and the dogs Z are unlocked and advantage is taken of this to open and close the doors N′ at the bottom of the ballot-holder guides before the plunger is returned by the descent of the bar Y. This is accomplished by the slotted plate Z′, which is actuated by connections with door or turnstile or with the rock-shaft X and is arranged to act on the lever C′, which is connected with the rock-shaft D′, to which the doors N′ are secured. It will of course be understood that suitable openings are made in the bed R′ to permit the doors N′ to swing downward, as indicated in Figs. 18 and 19. In the particular arrangement shown the rock-shaft X is provided with a arm F′ and connection K′, Fig. 17, which operates the sliding plate Z′. This plate is arranged to slide in any suitable guides, and it and its connected parts may be duplicated at each end of the machine. Its lower end may be guided by an opening in the bed R′, while its upper end slides in any suitable ways on the side frame of the machine. As the plate Z′ descends it actuates the lever C′ by means of a double-inclined slot, so as to open and close the door at the bottom of the ballot-holder guide before the plunger is returned by the descent of the bar Y. The slot in the plate is indicated at X′, Figs. 17 and 19, and it acts on the pin $u^3$ on the lever C′, which is connected with the rock shaft D′ by the link $v^2$ and the crank $z^2$. The slot X′ has a double-inclined portion $t^2$ $t^3$ at its lower end, which acts on the pin $u^3$ on the lever C′ to swing it first one way and then in the other, which motion is transmitted to the rock-shaft D′ to open and close the doors N′ at the bottoms of the guides for the ballot-holders. The lever C′ swings on a pivot $j^2$, carried by the side frame of the machine or, as in the construction shown, by the standard O′, fastened to the bed R′. In this arrangement the bracket O′ is provided with a slot $d^3$, Fig. 19, to permit the movement of the pin $u^3$. As the rock-shaft X turns and the slotted plate Z′ descends the first action of the slotted plate is to open and close the door N′, after which the straight part of the slot X′ holds the door closed during the remaining portion of its travel. The door is opened and closed when the voter enters the booth, and the plate Z′ is raised; but this movement has no effect on the voting, either straight ticket, selective, or irregular. The interior of the ballot-holder guide is given a form corresponding with that of the opening Q′ in the key-plate, and the upper part of the ballot-holder guide L′ is slotted to permit the movement of the arm G′. The return of the door N′ before the plunger P′ moves insures the ejection of any article or substance which may have been maliciously inserted in the guide L′. When the irregular device is applied to the channel-section, the front of the section is provided with an opening corresponding in shape with Q′ in the key-plate. Below the doors N′ the machine is provided with suitable chutes by which the ballot-holders are guided during their delivery into the ballot-receptacles at the base of the machine, which receptacles are kept locked during the election, to be opened at its close to allow the election-inspectors to ascertain the straggling or irregular vote by counting the ballots in the ballot-holders. In case of any irregularity in any of the irregular votes, such as two names on the same ballot, such vote will be rejected, except in the Presidential or group sections or lines.

It will of course be understood that this improved voting-machine will be provided with as many sections or lines of counters (with irregulars, if desired) as there are offices to be filled at any election at which the machine is to be used. In order to adapt the machine to multicandidate or group voting—that is, where each party has the right to nominate two or more candidates for the same office—one or more of the pins $i'$ in the abutments T T′ $T^2$ are removed, so as to allow lateral movement in the channel $h'$ to the abutment, which is normally held in place by the pin. Suppose it is required that the machine be adapted to a multicandidate group of two—that is, two candidates for coroner, say, are nominated by the same political party—then the pin $i'$ in the abutment is thus allowed a certain amount of lateral movement. Under this arrangement any two of the interlocking rods in the right-hand section of Fig. 2 can be thrust upward, or any two in the next adjacent section, or any one in one of the sections and any one in the other; but after two such rods have been operated no others in either of the sections can be thrust upward. The voter therefore can vote for any two regular candidates out of the twelve, and he cannot vote for more than two. The voter can also use the irregulars, or he can use one irregular and one counter. It will be obvious that by removing two or more of the pins $i'$ the system may be extended to multicandidate groups where three or more candidates are proposed by the same party for the same office and that by again fastening the abutment or abutments in place the machine can be readapted to voting for single candidates for any particular office, each line of counters then becoming independent of those in adjacent lines. It will also be observed that my improved machine, if provided with a sufficient number of lines or series of counters, will permit the use of any number of groups, each of any required number of candidates, and that such group or groups may be arranged in any desired relation with the single-candidate lines. An irregular slide or slides is also included in the group arrangement, and the sections or lines of counters, with or without the irregulars, are equally locked out by the use of a straight ticket, whether arranged in a group or groups or for single-candidate voting or in any required relative arrangement for these two styles of voting.

In Fig. 20 is shown a cam of a form which has been employed in connection with a turnstile to secure the proper motion of the connection $y'$ and rock-shaft X. It will be understood that the rock-shaft may be operated by any suitable mechanism from the door or turnstile of the voting-compartment.

It will be obvious to the skilled constructor that many alterations or changes from the inventions herein described may be made without departure from the fundamental principles thereof. Thus any suitable form of counter or registering device may be rendered visible for the purpose of taking the count from the same side of the key-plate on which the voting is done, and any such suitable counter may be provided with a marked or particolored portion which is visible to the voter to show that the mechanism operates at the time he votes.

The straight-ticket counters may be of a construction different from the selective-voting counters, and they may be arranged horizontally instead of vertically. The arrangement of the connections between the inlet or outlet doors and the restoring mechanism may be of any preferred kind. The interlocking mechanism may be variously modified.

Some of the improvements herein described may be employed in connection with a voting-machine which reads from the back or rear. The studs $m$ may be dispensed with, the levers being bent to properly connect with the interlocking rods. Any suitable locking devices may be employed on the interlocking rods and any suitable tripping mechanism. Rollers may be employed for the interlocking blocks. The relative dimensions of the star-wheels, counters, levers, and yokes may be varied. The counter-disks may be placed on separate axes instead of upon one, as shown. Any suitable mechanism may be employed for closing the doors of the irregular before the plunger returns, and the resetting or restoring mechanism may be of any suitable arrangement or construction.

It will be understood that instead of using the shaft U' the lever S' of the irregular plunger may be pivoted on a suitable stud carried by an arm or arms $n^2$, Fig. 18, attached to the section F. In this case the irregular device can be inserted in the machine along with the section, it being only necessary to connect the interlocking rod $a^4$. The guide L' is attached to the section in any suitable way, as by the flanges $x^2$, Fig. 18. As the guide L' is not as wide as the channel F the opening for the door N' is formed through the lug $e^8$ at the lower end of the section. The parts of this lug then project between the guide and the inside of the section, so as to secure the latter in place.

The invention having thus been described, what is claimed as new is—

1. In a voting-machine, the combination of a counter, an actuator therefor adapted to be operated by a voter, this operation causing said actuator to move said counter slightly but only enough to insure beyond all doubt the engagement of said counter by said actuator and to indicate to the voter that he has cast his vote, and positively-actuated means for positively returning said actuator to its normal position and causing said counter to complete its movement, thereby registering the vote, substantially as described.

2. In a voting-machine, the combination with a counter, of an actuator adapted to be operated by a voter, whereby the counter is moved without completing a step, and positively-actuated means for completing the movement of the counter, thereby registering a vote, and for positively returning said actuator to its normal position, substantially as described.

3. In a voting-machine, the combination with a movable ballot-indicator, and a counter-actuator, each forming a part of the permanent structure of the machine, of a counter, connections between said indicator and actuator, whereby the movement of the actuator advances the counter only enough to indicate to the voter that his vote has been cast, and devices for moving the actuator to complete the movement of the counter, whereby a vote is registered, and for positively returning said actuator, substantially as described.

4. In a voting-machine, the combination of a series of voting-keys, corresponding registering devices, means for moving said registering device by the movement of its corresponding key, said means being adapted to move said registering device only enough to indicate to the voter that his vote has been cast, and means for simultaneously completing the movement of each of said registering devices that have been partially moved by the actuating means, substantially as described.

5. In a voting-machine, the combination of a two-step counter with an actuator adapted to be operated by a voter to partially produce the first step of the movement of the counter, and means for completing the first step and producing the second step of the movement of the counter, substantially as described.

6. In a voting-machine, the combination of a counter, an actuator therefor adapted to be moved by a voter only enough to indicate to him that his vote has been cast, limiting means for said actuator and means for completing the movement of the counter, thereby registering a vote, said means being operated by the voter as he leaves the machine, substantially as described.

7. In a voting-machine, the combination of a counter, an actuator therefor adapted to be operated by a voter only enough to show him that his vote has been cast, means for indicating to the voter that his vote has been cast, and means for completing the movement of the counter by the voter as he leaves the machine, thereby registering a vote, substantially as described.

8. In a voting-machine, the combination of a counter, an actuator therefor adapted to be operated by the voter only enough to show him that his vote has been cast, a stop preventing the reverse movement of said actuator, and means actuated by the voter to complete the movement of the counter, substantially as described.

9. In a voting-machine, the combination of a counter, an actuator adapted to be operated by the voter to move said counter only enough to indicate to the voter that his vote has been set, resetting mechanism operated by the voter, and a connection operating to complete the movement of the counter from the movement of the resetting mechanism, thereby registering a vote, substantially as described.

10. In a voting-machine, the combination of a two-step counter, an actuator adapted to be operated by the voter to produce a part of the first step of the movement of the counter, resetting mechanism operated by the voter, and a connection operated by said resetting mechanism to complete the first step of the movement of the counter and to produce the second step of said movement, substantially as described.

11. In a voting-machine, the combination of a series of counters, each having a units-register provided with a star-wheel, suitable interlocking mechanism between the counters, inclined pallets adapted to engage the star-wheels and operate them by step-by-step movement, the parts being so arranged that said pallets will engage said star-wheels when operated by the voter, but will not produce the first step of the movement of the units-register, a series of keys corresponding to each pair of inclined pallets, resetting mechanism operated by the voter, and means operated by the resetting mechanism to complete the first step of the corresponding units-register, substantially as described.

12. In a voting-machine, the combination of two or more counters, each provided with a toothed wheel, interlocking mechanism between the counters, reciprocating pallets adapted to engage the toothed wheels and operate them by a step-by-step movement, the parts being so arranged that said pallets are operated by the voter only enough to indicate to him that his vote has been cast but not enough to complete the first step of the counter, a movable part or key for each counter which causes the pallet-reciprocating mechanism to engage with the pallets after the commencement of the first step of the movement of the toothed wheel, and mechanism operated by the voter after voting for reciprocating said pallets, substantially as described.

13. In a voting-machine, the combination of a series of counters, each having a units-register provided with a star-wheel, suitable interlocking mechanism between the counters, the inclined pallets adapted to engage the star-wheels and operate them by a step-by-step movement, a corresponding series of keys, resetting mechanism operated by the voter, and a suitable connection operating to complete the first step of the corresponding units-disk from the movement of the resetting mechanism, and to produce the second step of said disk from said movement, and suitable interlocking straight-ticket mechanism, substantially as described.

14. In a voting-machine, the combination of two or more series of two or more counters in each series, each counter having a units-register provided with a toothed wheel, suitable interlocking mechanism between the counters of each series, the inclined pallets engaging the toothed wheels and adapted to actuate them by a step-by-step movement, a series of movable keys corresponding with the counters, resetting mechanism operated by the voter, suitable connecting mechanism between each key and the resetting mechanism, whereby the first step of the corresponding units-register is completed and a second step produced by the resetting mechanism, and a corresponding series of independent interlocked straight-ticket counters, substantially as described.

15. In a voting-machine, the combination of a series of registers or counters, each having a units-disk provided with a toothed wheel, suitable interlocking mechanism between the counters, the inclined pallets engaging the toothed wheels, and adapted to actuate them by a step-by-step movement, a series of keys corresponding with the counters, resetting mechanism operated by the voter, connecting mechanism between each key and the resetting mechanism, whereby the first step of the corresponding units-register is completed and the second step thereof produced by the resetting mechanism, and an interlocked irregular-balloting device, substantially as described.

16. The combination in a voting-machine, of two or more series of two or more counters in each series, each counter having a units-register provided with a toothed wheel, suitable interlocking mechanism between the counters of each series, the inclined pallets engaging the toothed wheels and adapted to actuate them by a step-by-step movement, a series of keys corresponding with the counters, the resetting mechanism operated by the voter after voting, suitable connections operating to complete the first step of the selected units-register from the movement of the resetting mechanism and to produce the second step thereof, and an interlocked irregular-balloting device for each series of counters, substantially as described.

17. The combination in a voting-machine, of two or more series of two or more counters in each series, each counter having a units-register provided with a toothed wheel, suitable interlocking mechanism between the counters of each series, the inclined pallets engaging the toothed wheels and adapted to actuate them by a step-by-step movement, a series of keys corresponding with the counters, the resetting mechanism operated by the voter after voting, suitable counters operating to complete the first step of the selected units-register from the movement of the resetting mechanism, and to produce the second step thereof, and an interlocked irregular-balloting device for each series of counters, and suitable interlocked straight-ticket voting mechanism, and an interlocked irregular-balloting device, substantially as described.

18. The combination in a voting-machine, of two or more series of two or more counters in each series, interlocking mechanism between the counters of each series, comprising thickened interlocking rods and interlocking blocks, a movable abutment between the interlocking blocks of each series, movable parts or keys corresponding to each counter, the resetting mechanism operated by the voter after voting, suitable connections operating to complete the first step of the movements of the counters from the resetting mechanism, and to produce the second step thereof, whereby any one counter in either series or any two in the same series may be operated, substantially as described.

19. The combination in a voting-machine, of two or more series of two or more counters in each series interlocking mechanism between the counters of each series, comprising thickened interlocking rods and interlocking blocks, a movable abutment between the interlocking blocks of each series, movable parts or keys corresponding to each counter, the resetting mechanism operated by the voter after voting, suitable connections operating to complete the first step of the movements of the counters from the resetting mechanism and to produce the second step thereof, whereby any one counter in either series or any two in the same series may be operated, and an interlocked irregular-balloting device, substantially as described.

20. The combination in a voting-machine, of two or more series of two or more counters in each series, an irregular-balloting device for each series, interlocking mechanism between the counters in each series and between the counters and the irregulars, comprising thickened interlocking rods and interlocking blocks, a movable abutment between the interlocking blocks of each series, movable parts or keys corresponding to each counter, the resetting mechanism operated by the voter after voting, suitable connections operating to complete the first steps of the movements of the counters from the resetting mechanism, and to produce the second steps thereof, whereby any one counter or the irregular in either series or any one counter and the irregular or any two counters in the same series may be operated, substantially as described.

21. In a voting-machine, the combination with a series of counters and the interlocking mechanism, of the interlocking rods provided with trips, the keys adapted to move the rods, and the trip-shaft arranged to give the rods a further movement, and thereby complete the first of the steps performed in operating the counters, and produce the second step in said operation, substantially as described.

22. The combination, in a voting machine, of two or more series of two or more two-step counters in each series, an irregular-voting device interlocking with one of the series, interlocking mechanism for the counters in each series, comprising interlocking blocks and interlocking rods, a movable abutment between the interlocking rods of each series of counters, means for rendering the abutment stationary, movable parts or keys corresponding to each counter, the resetting mechanism actuated by the voter after voting and operating through suitable connections to make a part of the first step of the counting movement of the counter and the whole of the second step, whereby only one counter in each series, or only two or one counter and an irregular in the same series may be operated, or each series can be set for interlocked single-candidate voting independent of the adjacent series, substantially as described.

UNITED STATES VOTING MACHINE COMPANY,
By A. C. WADE,
*President.*

Witnesses:
A. GUTENT,
B. D. CHADWICK.